（12） United States Patent
Saito (10) Patent No.: US 6,804,182 B2
(45) Date of Patent: Oct. 12, 2004

(54) OPTICAL DISC REPRODUCING APPARATUS AND SEMICONDUCTOR INTEGRATED CIRCUIT AND THEREFOR

(75) Inventor: Nobuyuki Saito, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 605 days.

(21) Appl. No.: 09/827,249

(22) Filed: Apr. 5, 2001

(65) Prior Publication Data

US 2001/0038584 A1 Nov. 8, 2001

(30) Foreign Application Priority Data

Apr. 7, 2000 (JP) ........................................ 2000-105996

(51) Int. Cl.[7] .................................................. G11B 7/00
(52) U.S. Cl. .................. 369/47.17; 369/47.34
(58) Field of Search .......................... 369/47.34, 53.31, 369/47.32, 47.33, 47.31, 53.26, 59.24, 47.18, 47.21

(56) References Cited

U.S. PATENT DOCUMENTS 6,115,337 A * 9/2000 Takagi et al. ............ 369/47.33
6,373,794 B2 * 4/2002 Packer ..................... 369/30.23
6,519,216 B1 * 2/2003 Suenaga et al. .......... 369/47.18
6,594,213 B1 * 7/2003 Hayashi ................... 369/47.34

FOREIGN PATENT DOCUMENTS

| JP | 8-180591 | 7/1996 |
| JP | 8-335364 | 12/1996 |
| JP | 10-69728 | 3/1998 |

* cited by examiner

Primary Examiner—Nabil Hindi
(74) Attorney, Agent, or Firm—Mark P. Watson (57) ABSTRACT

When subcodes included in a CD format are reproduced, jitter is removed when the subcodes are synchronized with signal data. The data is connected together by using the subcode data to prevent interruptions of sound and pictures. An error correction unit performs error correction processing for signal data reproduced (read) from a CD. A memory stores the signal data whose error is corrected and a data output unit reads out the signal data stored in the memory according to a reference clock. A subcode detection/jitter removal unit detects subcode data reproduced from the CD and outputs the subcode data to the memory in synchronism with outputting of the signal data whose error is corrected by the error correction unit, to thereby remove jitter.

30 Claims, 7 Drawing Sheets

OPTICAL DISC REPRODUCING APPARATUS AND SEMICONDUCTOR INTEGRATED CIRCUIT AND THEREFOR

BACKGROUND OF THE INVENTION

1. Field of the Invention

The present invention relates to an optical disc reproducing apparatus that reproduces information recorded on an optical disc, and more particularly to an optical disc reproducing apparatus that can reproduce the information from both a digital versatile disc (DVD) and a compact disc (CD). Furthermore, the present invention relates to a semiconductor integrated circuit that is used in such an optical disc reproducing apparatus.

2. Description of the Related Art

Some of the conventional DVD players are of the type that can reproduce the information stored on both DVDs and CDs (i.e., DVD-CD combination player system). Since DVDs and CDs have different data formats, major parts of the circuits for their reproducing systems are independent from one another. A typical circuit structure for the reproducing system of a conventional DVD-CD combination player system is shown in FIG. 9.

Figure 9:
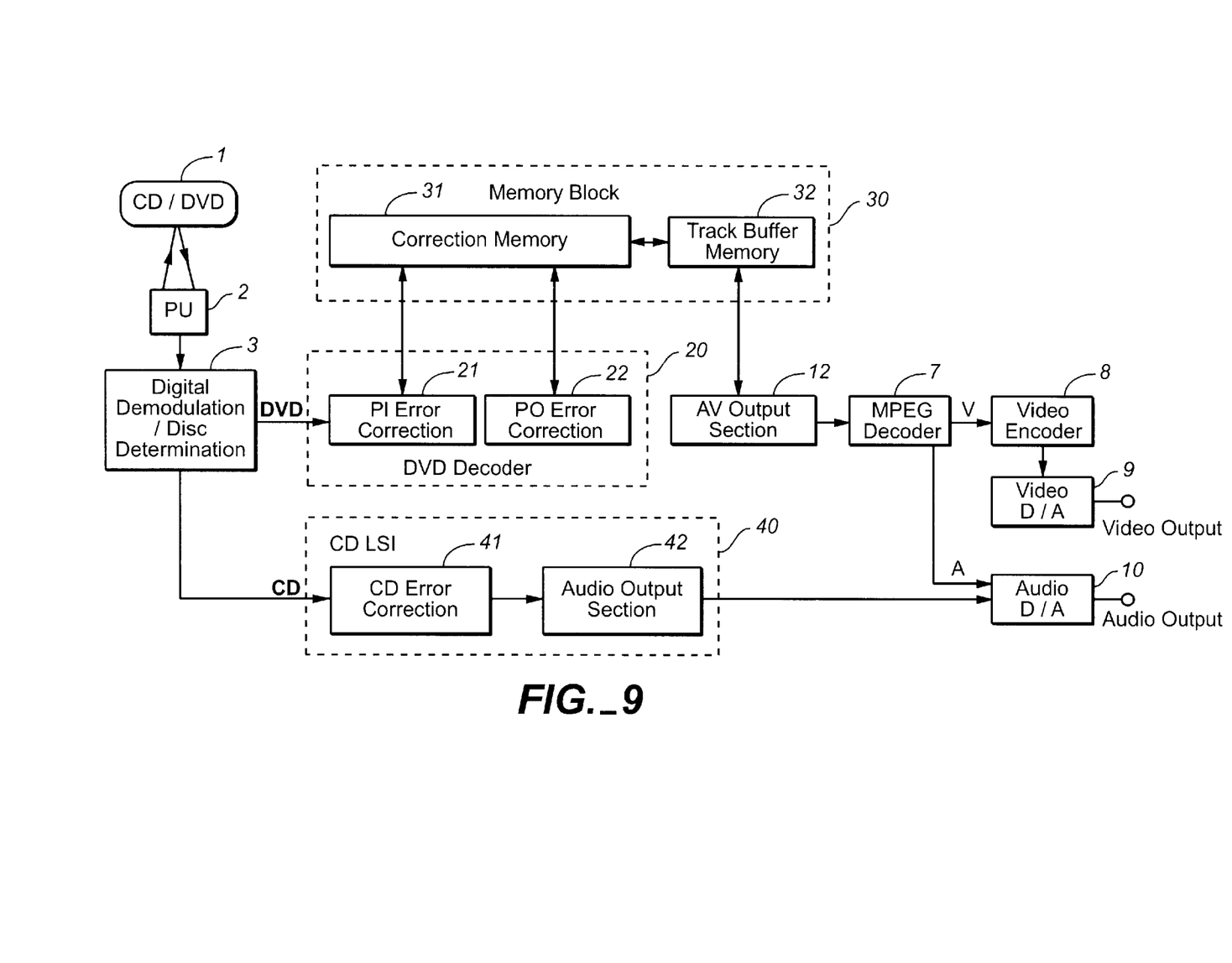
FIG. 9 shows a block diagram of a structure of a conventional reproduction system circuit of a DVD/CD combined player system.

Referring to FIG. 9, an optical pickup 2 irradiates laser light onto an optical disc 1 and obtains a reproduced signal from the reflected light. The optical pickup 2 is connected to a digital demodulation/disc determination circuit 3 that converts the reproduced signal into binary data to thereby perform digital demodulation. Also, it determines whether the disc being played is a DVD or a CD based on, for example, the reflected light from the disc.

Reproduced data of a DVD is input to a DVD decoder 20. The DVD decoder has a PI error correction section 21 that performs error correction using inner parity (inner code), and a PO error correction section 22 that performs error correction using outer parity (outer code). For the error correction, a large capacity correction memory 31 is used. A memory block 30 also includes a track buffer memory 32 in addition to the correction memory 31.

Data whose error is corrected and stored in the track buffer memory 32 is transmitted through an AV output section 12 to an MPEG decoder 7 that decodes the data, to thereby provide video data (V) and audio data (A). The video data is input through a video encoder 8 to a D/A converter 9 to provide the video output signals. The audio data is input to a D/A converter 10 to provide the audio output signals.

A large-scale-integrated (LSI) circuit 40 processes data reproduced from a CD. The LSI for CDs includes a CD error correction section 41 that performs error correction using CIRC (Cross Interleaved Reed-Solomon Code). Data whose error is corrected is output through an audio output section 42 included in the LSI for CDs to the D/A converter 10 to provide an analog audio signal.

In this manner, the DVD reproduction system and the CD reproduction system have independent circuit structures, except that the D/A converter 10 for audio signals is shared.

Japanese laid-open patent application HEI 8-180591 describes an audio signal synchronization method that enables continuous reproduction of an audio signal in both a transmission side apparatus and a receiver side apparatus that operate asynchronously. With the audio signal synchronization method, the transmission side apparatus reproduces data at N-fold speed and stores the data in a memory on the receiver side apparatus, and the receiver side apparatus reads out the data at the standard speed.

Japanese laid-open patent application HEI 8-335364 describes an optical disc reproducing device that is capable of reproducing video CDs and preventing dropout due to external vibrations and thereby enhancing resistance to vibration at the time of reproduction of data on musical CDs. In the optical disc reproducing device, an optical disc is rotated faster than the standard speed to accumulate reproduced data in a memory. When a track jump or focus error is detected, a track position before interruption of the data is re-accessed.

Alternatively, Japanese laid-open patent application HEI 10-69728 describes a disc reproducing apparatus that prevents the generation of sound skips due to external impacts without using a large capacity memory. In the disc reproducing apparatus, which is based on the assumption that the response characteristic of the tracking servo improves at a high-speed that is faster than the standard speed, data of n frames is read out from a disc that is rotated at a high speed, and then the pickup is jumped to the inner side by m tracks to read out the next n frames.

However, Japanese laid-open patent application HEI 8-180591 does not describe any countermeasures when reading errors occurs due to external vibrations. Japanese laid-open patent application HEI 8-335364 does not describe any concrete methods to connect together or to associate initially reproduced data and data reproduced after re-access. Furthermore, Japanese laid-open patent application HEI 10-69728 does not describe any countermeasures when reading errors occur in a high-speed reproduction, or methods for connecting data together.

In the case of CD-ROMs or video CDs, borders between sectors can be recognized with synchronizing patterns. However, in the case of audio CDs, only continuous audio data is recorded, so that borders between sectors cannot be recognized. Therefore, in effect, properly connecting data together in an audio CD is not simple. Conventionally, connection of data is performed by detecting whether or not data in specified regions concur with one another. However, substantial errors may be included in a bad disc, which causes problems in that, for example, an algorithm becomes complicated for accurately determining the concurrence of data.

OBJECTS OF THE INVENTION

In view of the problems described above, in accordance with a first object of the present invention, in an apparatus that can reproduce information stored on a CD, when subcodes included in a CD format (including an audio CD and a video CD) are reproduced, jitter is compensated for or corrected and the subcodes are synchronized with the data. The term "jitter" in the context of the reproducing apparatus refers generally to the degree of error in synchronization between information read from the optical disc (input data) and the reproduced information (output data). It is another object of the present invention to prevent interruptions of sound or pictures by connecting data together using the subcode data. Furthermore, it is another object of the present invention to obtain the above-described effects without increasing the memory capacity in an apparatus that can reproduce both DVDs and CDs. In addition, it is yet a further object of the present invention to provide a semiconductor integrated circuit that is to be used in an optical disc reproducing apparatus such as the one described above.

SUMMARY OF THE INVENTION

To solve the problems described above, an optical disc reproducing apparatus in accordance with the present invention includes: an error correction means or unit or circuit that performs error correction processing for signal data reproduced (read) from a CD; a memory or memory means that stores the signal data whose error is corrected; data output means or unit or circuit that reads out the signal data stored in the memory means according to a reference clock; and a subcode detection/jitter correction means or unit or circuit that detects subcode data reproduced from (read from) the CD and outputs the subcode data to the memory in synchronism with outputting of the signal data by the error correction unit, to thereby remove or correct jitter.

Also, in an embodiment of the present invention a semiconductor integrated circuit comprises the error correction means or unit or circuit, the data output means or unit or circuit, and the subcode detection/jitter correction means or unit or circuit as described above.

The optical disc reproducing apparatus or the semiconductor integrated circuit described above may further include a controller or control means that controls rotation of a CD at a high-speed that is faster than a standard speed and stores signal data reproduced therefrom in the memory or memory means, and, when a reproduction tracking fails or an error greater than a specified amount is generated in the signal data in a region of the CD, reproduces (reads) again the signal data in the region of the CD based on subcode data output by the subcode detection/jitter correction means or circuit or unit and stores the same in the memory.

Alternatively, the optical disc reproducing apparatus or the semiconductor integrated circuit described above may further include a controller or control means that controls rotation of a CD at a high-speed that is faster than a standard speed and stores signal data reproduced therefrom in the memory, changes reproduction conditions, and reproduces (reads) again the signal data in the region of the CD based on subcode data output by the subcode detection/jitter correction means or circuit or unit and stores the same in the memory.

The reproduction conditions may include at least one of a servo characteristic in CD rotational speed control, a servo characteristic in position control of an optical pickup, a gain of the optical pick up and a characteristic in wave-form equalization of the reproduced signal.

With the present invention having the features described above, when subcodes included in a CD format or a video CD format are reproduced (read), jitter is removed by synchronizing the subcodes with the signal data. Moreover, interruptions of sound and pictures can be prevented by connecting the data together using the subcode data.

The optical disc reproducing apparatus in accordance with the present invention may be an apparatus that can reproduce the information stored on both DVDs and CDs.

In this case, the optical disc reproducing apparatus or the semiconductor integrated circuit may further include a DVD decoder means or unit or circuit that stores signal data reproduced (read) from the DVD in the memory and decodes the same. Also, the optical disc reproducing apparatus or the semiconductor integrated circuit may further include: DVD access control means or controller that generates addresses for the DVD decoder to control accesses thereof; CD access control means or controller that generates addresses for CD error correction means or unit to thereby control accesses thereof; and upper address generation means or generator that generates upper addresses for accessing the memory based on the address generated by the DVD access control means (controller) or the address generated by the CD access control means.

In this manner, the CD data reproduction capacity can be improved by commonly sharing a memory for the DVD and the CD, without increasing the memory capacity.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

Embodiments of the present invention are described below with reference to the accompanying drawings. It is noted that the same reference numbers are used for the same elements in different figures, and duplicate descriptions thereof are omitted.

Figure 1:
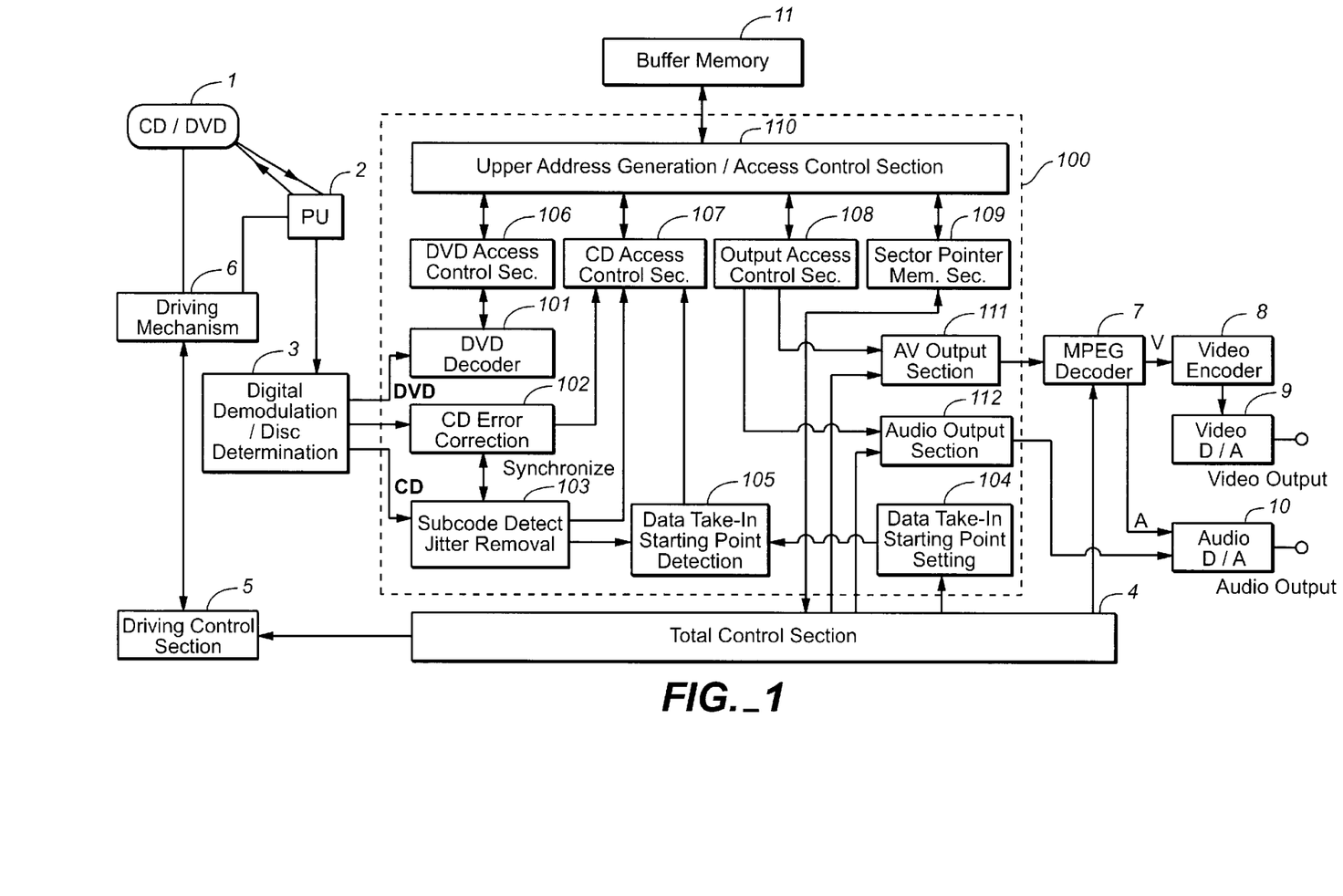
FIG. 1 shows a block diagram of a reproducing apparatus in accordance with a first embodiment of the present invention.

FIG. 1 shows a block diagram of an optical disc reproducing apparatus in accordance with a first embodiment of the present invention. The optical disc reproducing apparatus can reproduce information stored on at least one of a DVD, an audio CD, and a video CD.

Referring to FIG. 1, the optical disc reproducing apparatus has an optical pickup 2 that reads signals (information) recorded on an optical disc 1. The optical disc 1 and the optical pickup 2 are driven by a driving mechanism 6. A driving control section 5 controls the driving mechanism 6 to define the rotational speed of the optical disc 1 and the relative position between the optical disc 1 and the optical pickup 2. In this discussion the term "section", such as the driving control section, can also be referred to as a "unit." These functional "sections or units" can be part of an integrated circuit (IC), or a separate circuit with discrete elements, or an ASIC, or part of a general circuit that performs a particular function under software or firmware control. Reproduced signals obtained by the optical pickup 2 are converted to digital and digitally demodulated by a digital demodulation/disc determination circuit 3, and input to a signal processing integrated circuit (IC) 100 as reproduced data.

The signal processing IC 100 connects to a large-capacity buffer memory 11. This memory may be implemented using any storage device such as RAM, hard disc, diskette, etc. Audio/video data output from the signal processing IC 100 is decoded by an MPEG decoder 7 to produce video data (V) and audio data (A). The video data is transmitted through a video encoder 8 and input to a D/A converter 9 to produce video output signals. The audio data (A) output from the MPEG decoder 7 or an audio output section 112 of the signal processing IC is input to a D/A converter 10 to produce audio output signals. A total control section 4 performs overall control of the components described above. Although in FIG. 1, the total control section 4 is shown as a separate block outside of IC 100, in the present invention the total control section 4 may form part of IC 100. The total control section may include a CPU and a RAM or ROM with program instructions for executing the control functions described herein. Alternately, the total control section may be implemented in software, firmware, discrete components, ASIC, or combinations thereof.

An operation of the reproducing apparatus thus constructed is described in detail with reference to FIG. 1. The optical pickup 2 irradiates laser light against an optical disc 1, and obtains a reproduced signal (reads the stored information) from the reflected light. A digital demodulation/device determination circuit 3 that is connected to the optical pickup 2 determines whether the disc being reproduced (read) is at least one of a DVD and a CD. Then, the reproduced signal from the optical pickup 2 is demodulated by being converted to a binary signal to obtain reproduced data.

Reproduced data from a DVD is input to a DVD decoder 101. The DVD decoder performs error correction using inner parity and error correction using outer parity. The large-capacity buffer memory 11 is used in the error correction.

Data whose error is corrected is transferred through an AV output section 111 and output to the MPEG decoder 7. The data encoded by a high-efficiency coding is decoded by the MPEG decoder 7 to obtain ordinary video data (V) and audio data (A). The decoded video data is encoded by the video encoder 8 according to NTSC or PAL system, and converted into an analog video signal by the D/A converter 9 to produce video signals. On the other hand, the decoded audio data is converted into an analog audio signal by the D/A converter 10 to produce audio signals.

Referring back to the input side of IC 100, reproduced data from a CD is input to a CD error correction section 102, wherein error correction is performed on signal data included in the reproduced data. The CD error correction section performs error correction using CIRC (Cross Interleaved Reed-Solomon Code). The data transmission rate of the reproduced data (input data) is constantly changing due to jitter resulting from rotational irregularities of the disc. However, once the signal data is written into the buffer memory 11 and then read out using a reference clock, the jitter is removed.

The reproduced data from the CD is also input to a subcode detection/jitter removal section 103. Subcode data included in the reproduced data is generally used even when jitter affects the input data rate. However, in accordance with the present invention, the jitter is removed by synchronizing the subcode data with the signal data as it is stored in the buffer memory, which is described in detail below.

According to the present invention, the buffer memory 11 is commonly used for reproducing the data read from the DVD and the CD. Therefore, the present embodiment is provided with a DVD access control section 106 that generates addresses of the reproduced data from the DVD to thereby control an access operation from the DVD decoder 101, and a CD access control section 107 that generates addresses of the reproduced data from the CD to thereby control an access operation from the CD error correction section 102. Furthermore, an upper address generation/access control section 110 is provided to generate upper addresses based on the addresses generated by the two access control sections to thereby control accesses to the buffer memory 11. On the other hand, an output access control section 108 is provided to output data from the buffer memory 11. Also, a sector pointer storage section 109 is provided to store sector pointers that designate sectors in the buffer memory 11.

In accordance with the present embodiment, the large-capacity buffer memory 11 that is used for DVD data reproduction can also be used for CD data reproduction. Accordingly, the CD data may be reproduced at a high-speed and is stored in the buffer memory 11, such that, when a tracking failure occurs or an error is generated, the same section on the disc can be reproduced again (re-read), whereby the buffer memory 11 can be filled with correct data. Since CD data does not have headers, it is difficult to search heads of musical performance sections. However, by using subcode data that synchronizes with the signal data such that the jitter is removed, the data can be stored into the buffer memory in a known relationship with one another at any location. In particular, when a disc has a section having scratches or the like where the optical pickup is difficult to move to, data can be connected from a location in proximity to that section. Furthermore, the same location on the disc can be reproduced (re-read) multiple times while changing conditions such as, for example, a servo characteristic in CD rotational speed control, a servo characteristic in position control of the optical pickup, a gain of the optical pickup, and a waveform equalization characteristic, to thereby reduce the error rate.

The signal data with the error corrected in this manner is output through the audio output section 112 to the D/A converter 10 for audio signals, where it is converted to an analog audio signal. The example described herein is in the case of an audio CD. However, in the case of a video CD, the control of writing data in the memory is performed using header data instead of the subcode. Data on the video CD may be MPEG decoded, and then encoded by the video encoder according NTSC system or PAL system, and output to the D/A converter 9 for video signals, where it is converted to an analog video signal. It is noted that the data, once stored in the buffer memory 11, can be output at any speed. Therefore, depending on different specifications of audio CDs or video CDs, any output method can be selected. For example, in the case of a super video CD, a speed twice as fast as the standard speed can be used, and the reproduced data can be output in serial or parallel.

Figure 2:
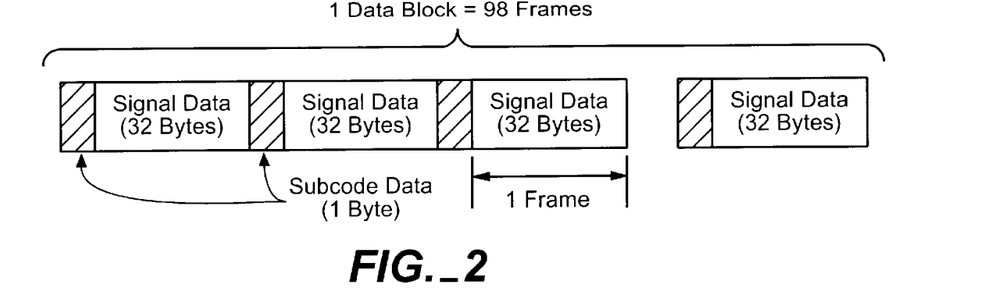
FIG. 2 shows a data structure of a CD format.
Figure 3:
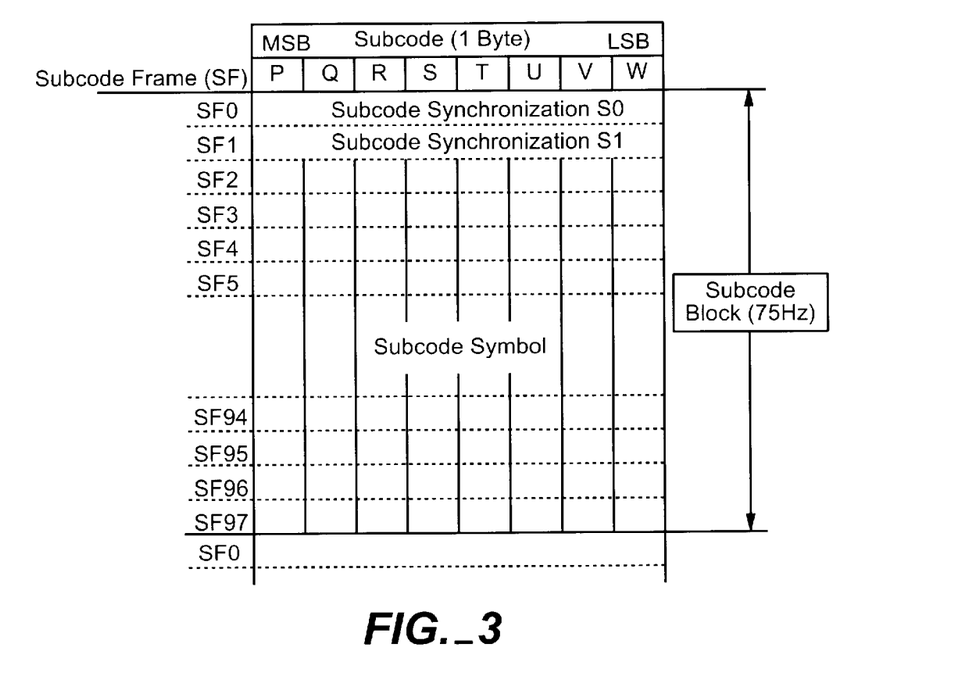
FIG. 3 shows a subcode structure of a CD format.

Referring to FIG. 2 and FIG. 3, a data structure of the CD format is described below. As shown in FIG. 2, one data frame is composed of one byte subcode data and thirty-two bytes signal data. Further, a group of ninety-eight of such data frames forms one data block. Also, as shown in FIG. 3, one byte subcode data in one subcode frame includes 8 bits P to W. In accordance with the present embodiment, among the 8 bits of subcodes, subcode Q is used as a label of the signal data. One subcode block has a cycle of 75 Hz, and includes therein ninety-eight subcode frames SF0 to SF97, and therefore includes ninety-eight bits of subcodes Q. The subcodes Q represent the musical performance passing time (minutes, seconds) and frame numbers. By using these data to manage sectors, data writing and reading can be performed at any sector.

In accordance with the present embodiment, separation between the signal data and the subcode data is conducted by using frame synchronizing data stored in the CD. In other words, data input enable signals and subcode input enable signals are generated based on the frame synchronizing data, and reproduced data is separated based on these signals.

Figure 4:
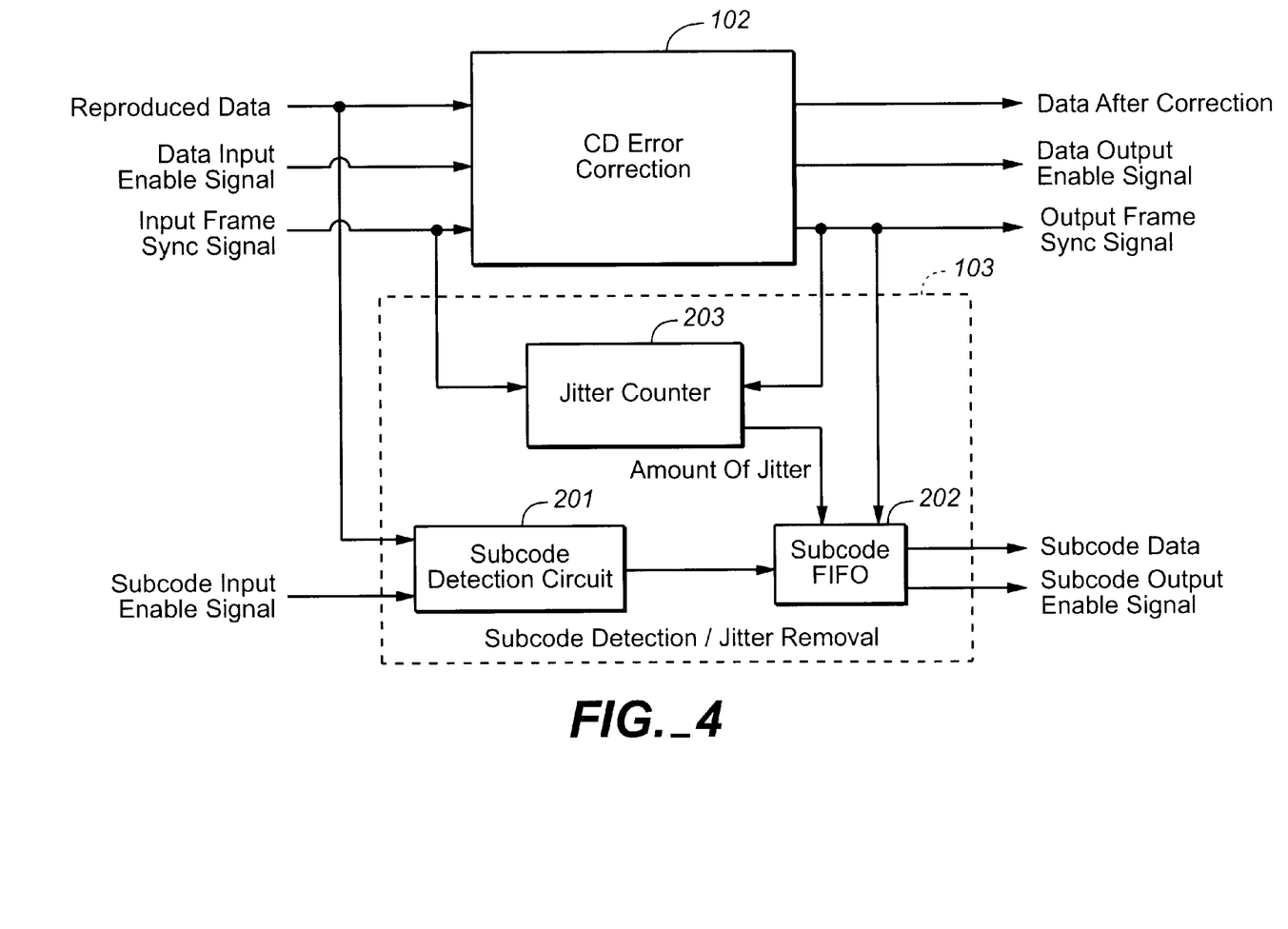
FIG. 4 shows a structure for subcode detection and jitter removal in accordance with the first embodiment of the present invention.

Next, referring to FIG. 4, subcode detection and removal of jitter are described. FIG. 4 shows a structure for subcode detection and removal of jitter in accordance with one embodiment of the present invention. Referring to FIG. 4, the CD error correction section 102 takes in the signal data included in the reproduced data according to data input enable signal, to perform a CIRC decoding process. The data input enable signal is a clock signal for taking in one byte of the reproduced data. The data whose error has been corrected is output together with a data output enable signal and written in a buffer memory. Also, an input frame synchronizing signal is input to the CD error correction section 102. Each one frame of the reproduced data is composed of thirty-two bytes, and therefore an input frame synchronizing signal is input for each thirty-two bytes of the reproduced data. Also, the CD error correction section 102 outputs an output frame synchronizing signal.

A subcode detection circuit 201 detects subcode data included in the reproduced data according to a subcode input enable signal, and outputs the detected subcode data to a subcode FIFO 202. The subcode data is input at each one frame of the signal data, and therefore the subcode input enable signal corresponds one-to-one to the input frame synchronizing signal.

The relationship between the output timing of the signal data and output timing of the subcode data is not constant due to jitter. Accordingly, in accordance with the present embodiment, the amount of jitter of the signal data is detected to thereby control output of the subcode data, such that the timing relationship of the subcode data and the signal data is maintained constant.

A jitter counter 203 calculates the amount of jitter based on a time difference between the input frame synchronizing signal and the output frame synchronizing signal, and outputs that amount to the subcode FIFO 202 that stores the subcode data. The subcode FIFO controls the output timing of the subcode data based on the amount of jitter and the output frame synchronizing signal to maintain a constant timing relationship between the subcode data and the signal data. The subcode output enable signal is also output together with the subcode data.

Figure 5:
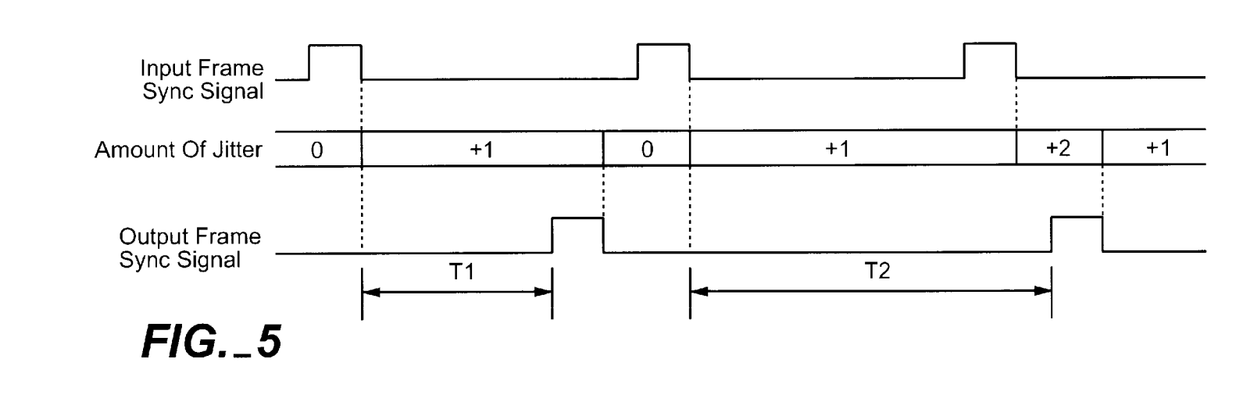
FIG. 5 is a diagram used in describing the calculation of the amount of jitter in accordance with the first embodiment of the present invention.

FIG. 5 illustrates the manner of calculation of the amount of jitter. During period T1, the disc rotation is slow, and therefore even when data output for one frame is completed, the next frame is not inputted. In such a case, an amount of jitter (+1) is subtracted (from +1) to make it 0. The amount of "jitter" in this exemplary embodiment can be viewed as the lead of the input data to the output data. Under normal circumstances the input data (next frame) should lead the output data (previous frame) by just one (+1) frame. On the other hand, during period T2, the disc rotation is fast, and therefore, before data output for one frame is completed, the next frame is inputted. In such a case, an amount of jitter (+1) is added +1 (normal) to make it +2.

Figure 6:
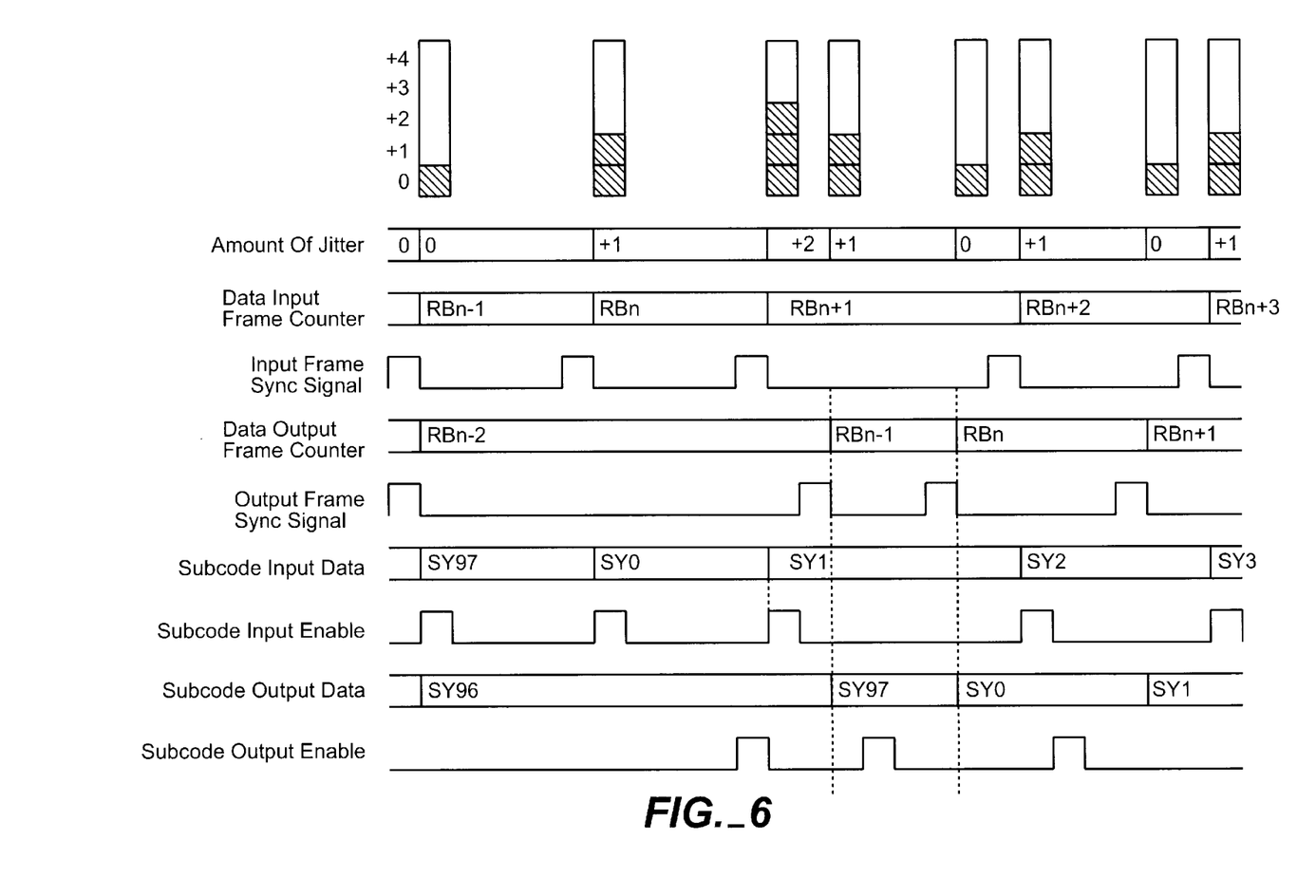
FIG. 6 is a diagram used in describing an operation of the subcode FIFO in accordance with the first embodiment of the present invention.

FIG. 6 is a chart for describing an operation of the subcode FIFO. After data input frames $RB_{n-1}$, $RB_n$, $RB_{n+1}$, . . . are inputted, and the error correction is conducted, they are outputted as data output frames $RB_{n-1}$, $RB_n$, $RB_{n+1}$, . . . . At this moment, based on a time difference between the input frame synchronizing signal and the output frame synchronizing signal, the amount of jitter is calculated. Based on the amount of jitter, subcode input data SY97, SY0, SY1 . . . are delayed and output as subcode output data SY97, SY0, SY1 . . . at timings corresponding to the data output frames $RB_{n-1}$, $RB_n$, $RB_{n+1}$, . . . . Thus, the subcode output data is synchronized with the data output frames to thereby remove any jitter caused by, for example, variations in disc rotation speed.

Figure 7:
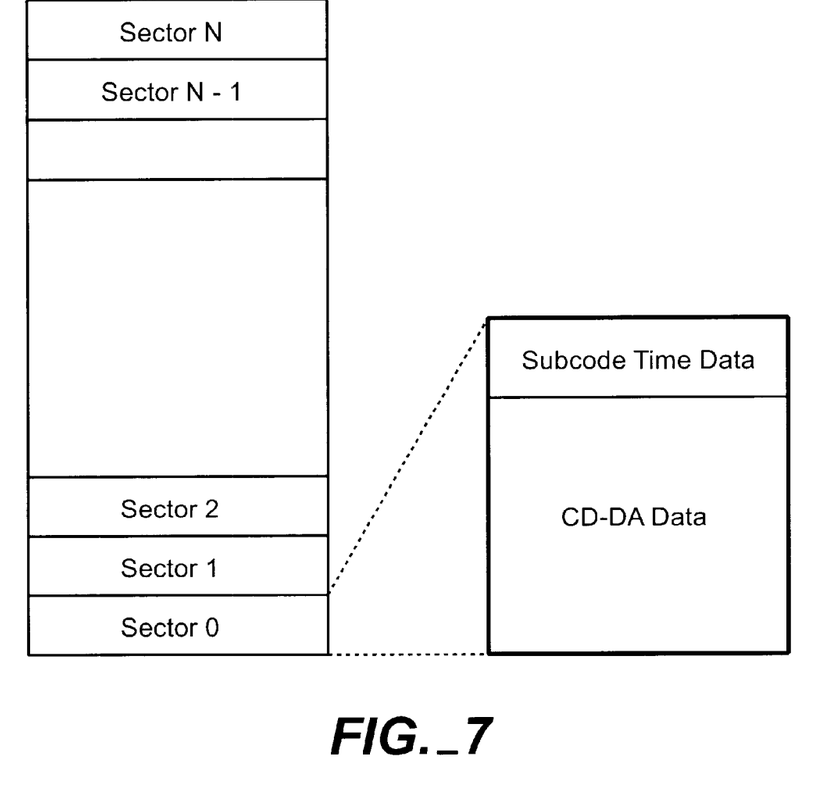
FIG. 7 shows a sector structure of a buffer memory, with subcode data included in each of the sectors, and data.

Next, referring to FIG. 7, sector divisions of a buffer memory are described. FIG. 7 shows a sector structure of buffer memory 11 and subcode data included in each of the sectors and data. As shown in FIG. 7, the buffer memory is divided into a plurality of sectors, and a status region is provided in each of the sectors for writing subcode time data (subcode Q), which are saved together with CD-DA data (signal data). In this manner, the data sector management is implemented, such that data can be connected together from any sectors in the buffer memory. In other words since related data is connected by their subcode time data, they do not have to be connected by their physical relationship in the buffer memory 11.

Figure 8:
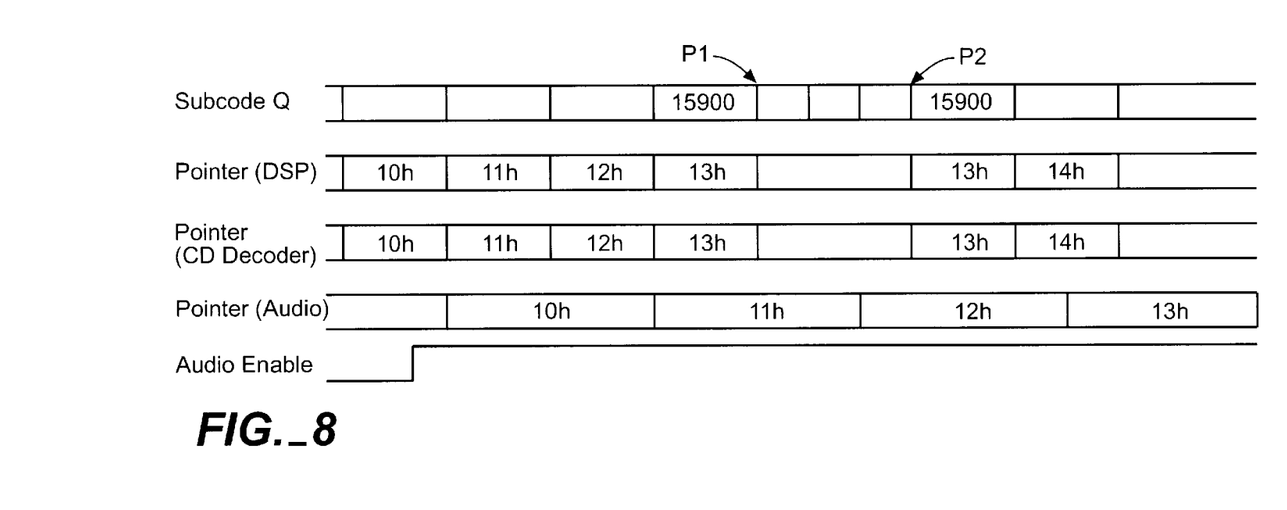
FIG. 8 is a diagram used in describing data connection in a buffer memory.

Next, referring to FIG. 1 and FIG. 8, connection of data in a buffer memory is described. Addresses of the buffer memory are managed by pointers. Referring to FIG. 8, when the subcode Q becomes "15900" at time P1, the data reading operation is temporarily interrupted due to, for example, a reproduction tracking deviation, an error generated, or the like. At this point of time (P1), data in the buffer memory corresponding to pointers "11h, 12h, 13h" are in preemptive reading regions. At this moment, the subcode Q "15900" of the sector where reading stops is stored in a sector pointer memory section 109.

Also, this subcode is reported to the total control section 4, and a data take-in starting point setting section 104 sets the same in a data take-in starting point detection section 105. Reproduction (reading) of the data on the disc is re-started at point P2, and the data take-in starting point detection section 105 seeks the subcode Q "15900" in the reproduced data. When the subcode Q "15900" is detected, the CD access control section 107 re-starts taking in the data, and stores the data taken in the buffer memory 11. In this manner, the sectors in the buffer memory can be correctly connected together. When the buffer memory is full, the data taking operation is temporarily stopped: and when the buffer memory has an empty space, then the data taking operation is re-started.

Effects of the Invention

As described above, in accordance with the present invention, when subcodes included in a CD format are reproduced, jitter is removed and the subcodes are synchronized with signal data. Further, by using the subcode data, sector management within a buffer memory is conducted for audio/video data on a CD that is originally continuous. As a result, the data can be correctly connected together from any locations in the buffer memory. Therefore, even when an error occurs during data reproduction of a bad disc, a high-speed reproduction is conducted to read the disc again and the data is connected together. As a result, interruptions of sound and pictures can be prevented. Moreover, a memory is commonly shared for DVDs and for CDs, such that the CD data reproduction capacity can be increased without increasing the total memory capacity.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. An optical disc reproducing apparatus that reproduces signal data stored on a compact disc (CD), the apparatus comprising:
   error correction means for error correction processing of signal data reproduced from the CD;
   memory means for storing the signal data corrected by the error correction means;
   subcode detection/jitter removal means for detecting subcode data reproduced from the CD and for removing jitter by outputting the subcode data to the memory means in synchronism with outputting of the corrected signal data by the error correction means; and
   data output means for reading out the signal data stored in the memory means according to a reference clock.

2. An optical disc reproducing apparatus according to claim 1, further comprising control means for controlling rotation of the CD at a high-speed faster than a standard speed, and for controlling storage of signal data reproduced from the CD in the memory means, and, when one of a reproduction tracking fails and an error is generated in the signal data in a region of the CD, for controlling reproducing again the signal data in the region of the CD based on subcode data output by the subcode detection/jitter removal means and for controlling storing the signal data that was reproduced again in the memory means.

3. An optical disc reproducing apparatus according to claim 1, further comprising control means for controlling rotation of the CD at a high-speed faster than a standard speed, and for controlling storage of signal data reproduced from the CD in the memory means, and for changing reproduction conditions, and for controlling reproducing again the signal data in a region of the CD based on subcode data output by the subcode detection/jitter removal means and for controlling storing the signal data that was reproduced again in the memory means.

4. An optical disc reproducing apparatus according to claim 3, wherein the reproduction conditions include at least one of a servo characteristic in CD rotational speed control, a servo characteristic in position control of an optical pickup, a gain of the optical pick up, and a characteristic in wave-form equalization of the reproduced signal.

5. An optical disc reproducing apparatus according to claim 1 further comprising DVD decoder means for decoding signal data reproduced from a DVD and for storing the decoded signal data from the DVD in the memory means.

6. An optical disc reproducing apparatus according to claim 5, further comprising:
   DVD access control means for generating addresses for the DVD decoder means to access the memory means;
   CD access control means for generating addresses for the CD error correction means to access the memory means; and
   upper address generation means for generating an upper address for accessing the memory means based on the address generated by the DVD access control means or the address generated by the CD access control means.

7. A semiconductor integrated circuit for use in an optical disc reproducing apparatus that reproduces a compact disc (CD), the semiconductor device comprising:
   error correction means for error correction processing of signal data reproduced from the CD;
   subcode detection/jitter removal means for detecting subcode data reproduced from the CD and for removing jitter by outputting the subcode data to an external memory in synchronism with outputting of the corrected signal data by the error correction means; and
   data output means for reading out the signal data stored in the external memory according to a reference clock.

8. A semiconductor integrated circuit according to claim 7, further comprising control means for controlling rotation of the CD at a high-speed faster than a standard speed, and for controlling storage of signal data reproduced from the CD in the external memory, and, when one of a reproduction tracking fails and an error is generated in the signal data in a region of the CD, for controlling reproducing again the signal data in the region of the CD based on subcode data output by the subcode detection/jitter removal means and for controlling storing the signal data that was reproduced again in the external memory.

9. A semiconductor integrated circuit according to claim 7, further comprising control means for controlling rotation of the CD at a high-speed faster than a standard speed, and for controlling storage of signal data reproduced from the CD in the external memory, and for changing reproduction conditions, and for controlling reproducing again the signal data in a region of the CD based on subcode data output by the subcode detection/jitter removal means and for controlling storing the signal data that was reproduced again in the external memory.

10. A semiconductor integrated circuit according to claim 9, wherein the reproduction conditions include at least one of a servo characteristic in CD rotational speed control, a servo characteristic in position control of an optical pickup, a gain of the optical pick up, and a characteristic in wave-form equalization of the reproduced signal.

11. A semiconductor integrated circuit according to claim 7, wherein the semiconductor integrated circuit further comprises DVD decoder means for decoding signal data reproduced from a DVD and for storing the decoded signal data from the DVD in the external memory.

12. A semiconductor integrated circuit according to claim 11, further comprising:
   DVD access control means for generating addresses for the DVD decoder means to access the external memory;
   CD access control means for generating addresses for the CD error correction means to access the external memory; and
   upper address generation means for generating an upper address for accessing the external memory based on the address generated by the DVD access control means or the address generated by the CD access control means.

13. An optical disc reproducing apparatus that reproduces signal data stored on a compact disc (CD), the apparatus comprising:
   an error correction unit that performs error correction processing of signal data reproduced from the CD;
   a memory that stores the signal data corrected by the error correction unit;
   a subcode detection/jitter removal unit that detects subcode data reproduced from the CD and that removes jitter by outputting the subcode data to the memory in synchronism with outputting of the corrected signal data by the error correction unit; and
   a data output unit that reads out the signal data stored in the memory according to a reference clock.

14. An optical disc reproducing apparatus according to claim 13, further comprising a controller that controls rotation of the CD at a high-speed faster than a standard speed, and that controls storage of signal data reproduced from the CD in the memory, and, when one of a reproduction tracking fails and an error is generated in the signal data in a region of the CD, controls reproducing again the signal data in the region of the CD based on subcode data output by the subcode detection/jitter removal unit and controls storing the signal data that was reproduced again in the memory.

15. An optical disc reproducing apparatus according to claim 13, further comprising a controller that controls rotation of the CD at a high-speed faster than a standard speed, and that controls storage of signal data reproduced from the CD in the memory, and that changes reproduction conditions, and that controls reproducing again the signal data in a region of the CD based on subcode data output by the subcode detection/jitter removal unit and that controls storing the signal data that was reproduced again in the memory.

16. An optical disc reproducing apparatus according to claim 15, wherein the reproduction conditions include at least one of a servo characteristic in CD rotational speed control, a servo characteristic in position control of an optical pickup, a gain of the optical pick up, and a characteristic in wave-form equalization of the reproduced signal.

17. An optical disc reproducing apparatus according to claim 13 further comprising a DVD decoder that decodes signal data reproduced from a DVD and that stores the decoded signal data from the DVD in the memory.

18. An optical disc reproducing apparatus according to claim 17, further comprising:
a DVD access controller that generates addresses for the DVD decoder to access the memory;
a CD access controller that generates addresses for the CD error correction unit to access the memory; and
an upper address generation unit that generates an upper address for accessing the memory based on the address generated by the DVD access controller or the address generated by the CD access controller.

19. A semiconductor integrated circuit for use in an optical disc reproducing apparatus that reproduces a compact disc (CD), the semiconductor device comprising:
an error correction unit that performs error correction processing of signal data reproduced from the CD;
a subcode detection/jitter removal unit that detects subcode data reproduced from the CD and that removes jitter by outputting the subcode data to an external memory in synchronism with outputting of the corrected signal data by the error correction unit; and
a data output unit that reads out the signal data stored in the external memory according to a reference clock.

20. A semiconductor integrated circuit according to claim 19, further comprising a controller that controls rotation of the CD at a high-speed faster than a standard speed, and that controls storage of signal data reproduced from the CD in the external memory, and, when one of a reproduction tracking fails and an error is generated in the signal data in a region of the CD, controls reproducing again the signal data in the region of the CD based on subcode data output by the subcode detection/jitter removal unit and controls storing the signal data that was reproduced again in the external memory.

21. A semiconductor integrated circuit according to claim 19, further comprising a controller that controls rotation of the CD at a high-speed faster than a standard speed, and that controls storage of signal data reproduced from the CD in the external memory, and that changes reproduction conditions, and controls reproducing again the signal data in a region of the CD based on subcode data output by the subcode detection/jitter removal unit and controls storing the signal data that was reproduced again in the external memory.

22. A semiconductor integrated circuit according to claim 21, wherein the reproduction conditions include at least one of a servo characteristic in CD rotational speed control, a servo characteristic in position control of an optical pickup, a gain of the optical pick up, and a characteristic in wave-form equalization of the reproduced signal.

23. A semiconductor integrated circuit according to claim 19, wherein the semiconductor integrated circuit further comprises a DVD decoder that decodes signal data reproduced from a DVD and that stores the decoded signal data from the DVD in the external memory.

24. A semiconductor integrated circuit according to claim 23, further comprising:
a DVD access controller that generates addresses for the DVD decoder to access the external memory;
a CD access controller that generates addresses for the CD error correction unit to access the external memory; and
an upper address generation unit that generates an upper address for accessing the external memory based on the address generated by the DVD access controller or the address generated by the CD access controller.

25. A method of operating an optical disc reproducing apparatus that reproduces signal data stored on a compact disc (CD), the method comprising:
performing error correction processing of signal data reproduced from the CD;
storing the signal data corrected by the error correction processing;
detecting subcode data reproduced from the CD and removing jitter by outputting the subcode data to a memory in synchronism with outputting of the corrected signal data to the memory; and
reading out the signal data stored in the memory according to a reference clock.

26. A method according to claim 25, further comprising controlling rotation of the CD at a high-speed faster than a standard speed, and controlling storage of signal data reproduced from the CD in the memory, and, when one of a reproduction tracking fails and an error is generated in the signal data in a region of the CD, controlling reproducing again the signal data in the region of the CD based on output subcode data and controlling storing the signal data that was reproduced again in the memory.

27. A method according to claim 25, further comprising controlling rotation of the CD at a high-speed faster than a standard speed, and controlling storage of signal data reproduced from the CD in the memory, and changing reproduction conditions, and controlling reproducing again the signal data in a region of the CD based on output subcode data and controlling storing the signal data that was reproduced again in the memory.

28. A method according to claim 27, wherein the reproduction conditions include at least one of a servo characteristic in CD rotational speed control, a servo characteristic in position control of an optical pickup, a gain of the optical pick up, and a characteristic in wave-form equalization of the reproduced signal.

29. A method according to claim 25 further comprising decoding signal data reproduced from a DVD and storing the decoded signal data from the DVD in the memory.

30. A method according to claim 25, further comprising:
generating addresses for a DVD decoder to access the memory;
generating addresses for a CD error correction unit to access the memory; and
generating an upper address for accessing the memory based on the address generated by a DVD access controller or the address generated by a CD access controller.

* * * * *

UNITED STATES PATENT AND TRADEMARK OFFICE
CERTIFICATE OF CORRECTION

PATENT NO. : 6,804,182 B2
DATED : October 12, 2004
INVENTOR(S) : Nobuyuki Saito It is certified that error appears in the above-identified patent and that said Letters Patent is hereby corrected as shown below:

Title page,
Item [54], Title, change "OPTICAL DISC REPRODUCING APPARATUS AND SEMICONDUCTOR INTEGRATED CIRCUIT AND THEREFOR" to
-- OPTICAL DISC REPRODUCING APPARATUS AND SEMICONDUCTOR INTEGRATED CIRCUIT USED THEREFOR --.

Signed and Sealed this

Twenty-fifth Day of January, 2005

JON W. DUDAS
*Director of the United States Patent and Trademark Office*